United States Patent [19]

Watanabe et al.

[11] 4,118,210

[45] Oct. 3, 1978

[54] METHOD AND APPARATUS FOR MANUFACTURING GLASS FIBERS USING DEFLECTABLE AIR CURTAIN

[75] Inventors: Takeshi Watanabe; Kazuo Nishimaki; Kazuo Shimanuki; Katuo Mita; Satoru Konno, all of Fukushima, Japan

[73] Assignee: Nitto Boseki Co., Ltd., Fukushima, Japan

[21] Appl. No.: 828,690

[22] Filed: Aug. 29, 1977

[30] Foreign Application Priority Data

Aug. 31, 1976 [JP] Japan .................. 51-103901

[51] Int. Cl.$^2$ .................. C03B 37/02
[52] U.S. Cl. .................. 65/2; 65/12
[58] Field of Search .................. 65/1, 2, 11 R, 11 W, 65/12, 4 R, 9, 5, 16

[56] References Cited

U.S. PATENT DOCUMENTS

| 2,921,342 | 1/1960 | Siefert et al. ............ 65/4 R |
| 3,295,943 | 1/1967 | Mabra ............ 65/9 |
| 3,969,099 | 7/1976 | Reese ............ 65/12 X |
| 4,033,742 | 7/1977 | Nichols et al. ............ 65/12 X |

FOREIGN PATENT DOCUMENTS 517,218  1/1976  Japan ............ 65/1

Primary Examiner—Robert L. Lindsay, Jr.
Attorney, Agent, or Firm—Sughrue, Rothwell, Mion, Zinn and Macpeak

[57] ABSTRACT

An air flow supplied by a duct 10 adjacent a melt furnace 3 is normally directed downwardly through a plurality of nozzles 12 in the bottom of the duct towards a floor grate 13 or the like communicating with an exhaust duct 14, to thereby form a heat shielding air curtain 11 to protect the operator/controller. During the initial start-up period of the filament draw forming operation, however, a pivotal damper plate 15 adjacent the supply duct may be raised to deflect the air flow across the bottom of the orifice plate 4 of the melt furnace 3, to thereby cool the molten glass cones at the orifice exits and increase their viscosity, which serves to stabilize the filament forming conditions and prevent adjacent cones/filaments from converging together.

7 Claims, 4 Drawing Figures

METHOD AND APPARATUS FOR MANUFACTURING GLASS FIBERS USING DEFLECTABLE AIR CURTAIN

BACKGROUND OF THE INVENTION

This invention relates to a method and apparatus for draw forming glass fibers wherein a flow of air established adjacent a melt furnace is first directed across the orifice plate thereof to provide additional cooling capacity during the initial start-up period, and is thereafter directed downwardly parallel to the fiber or filament flow to provide a heat shielding air curtain to protect the operator.

In the manufacture of glass fibers it is generally desirable to minimize the diameter of the fibers while at the same time maximizing or enhancing productivity. To this end a plurality of flow holes are typically formed in the bottom orifice plate of a melt furnace at a high density such that molten glass cones are formed at the orifice outlets closely adjacent one another, and are simultaneously cooled and drawn down into thin filaments. As the hole density increases, however, there is a tendency for the cones and filaments to contact each other and flood, particularly during the initial start-up period. If during such period, however, air is blown across the orifice plate surface in a direction parallel or slightly inclined thereto to cool the molten glass cones and increase their viscosity, the convergence of the filaments can be prevented during their formative period. Such a technique is disclosed in Japanese Laid-open Patent Application No. 7218/1976, for example.

It is also known to form a protective air partition or curtain to separate an operator's working area from a hot glass fiber draw forming area, as evidenced by Japanese Patent Application Publication (OPI) No. 30051/1970 (U.S. Ser. No. 657,622 (Aug. 1, 1967)).

SUMMARY OF THE INVENTION

The present invention represents a further development of the above-described conventional techniques, and both combines and improves upon them. In this invention an air flow supplied by a duct adjacent a melt furnace is normally directed downwardly through a plurality of nozzles in the bottom of the duct towards a floor grate or the like communicating with an exhaust duct, to thereby form a heat shielding air curtain to protect the operator/controller. During the initial start-up period of the filament draw forming operation, however, a pivotal damper plate adjacent the supply duct may be raised to deflect the air flow across the bottom of the orifice plate of the melt furnace, to thereby cool the molten glass cones at the orifice exits and increase their viscosity, which serves to stabilize the filament forming conditions and prevent adjacent cones/filaments from converging together.

DETAILED DESCRIPTION OF THE INVENTION

Figure 1:
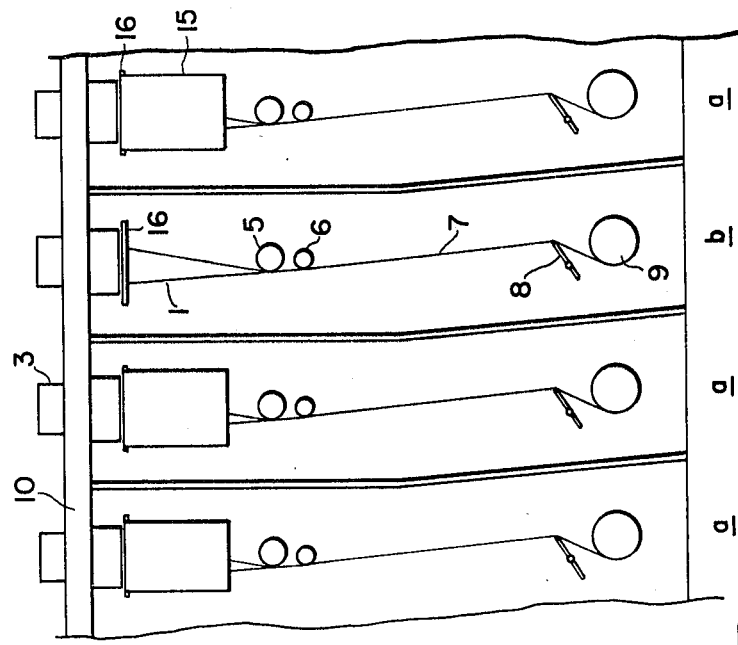
FIG. 1 shows a simplified side view, partly in section, of a glass fiber draw forming apparatus including a pivotal damper or air deflection plate according to the present invention.
Figure 2:
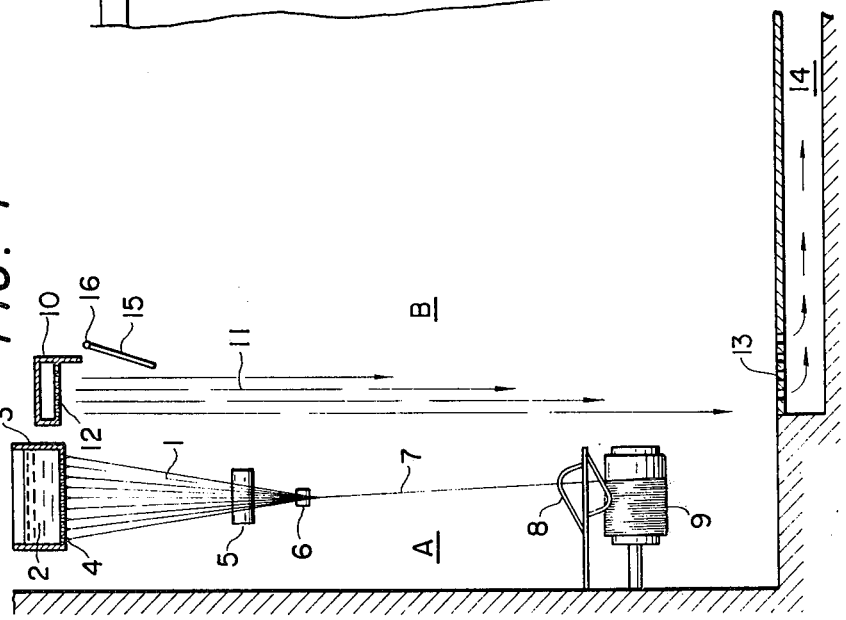
FIG. 2 shows a front view of a plurality of such draw forming apparatusses.

Referring now to FIGS. 1 and 2, glass fiber filaments 1 are drawn through flow holes in an orifice plate 4 on the bottom of a melt furnace 3 containing molten glass 2, and are coated with a wetting agent by a roller device 5. The treated filaments are thereafter collected into a strand 7 by a gathering device 6 and wound onto a spool 9 by a traversing device 8. Reference numeral 10 designates a duct for delivering air to form a heat shielding air partition or curtain 11. A plurality of air flow ejecting holes 12 are formed in the bottom of the duct to direct the air flow downwardly in front of the forming and winding apparatus. Reference numeral 13 designates a floor grate for exhausting the air curtain through a duct 14. The filament forming and winding area is designated section A, while the adjacent section B is the operator's area.

A plurality of melt furnaces 3 are disposed in parallel, as shown in FIG. 2, and pivotal damper plates 15 are provided for each furnace. The damper plates are slightly wider than the spinning furnaces, and they are pivotally mounted on shafts 16. The forming and winding stations $a$ in FIG. 2 are operating under continuous, stabilized conditions with their damper plates lowered to form heat shielding air curtains, while station $b$ has its damper plate raised during the initial start-up period to deflect the air flow from the duct 10 across the bottom of the orifice plate.

Figure 3:
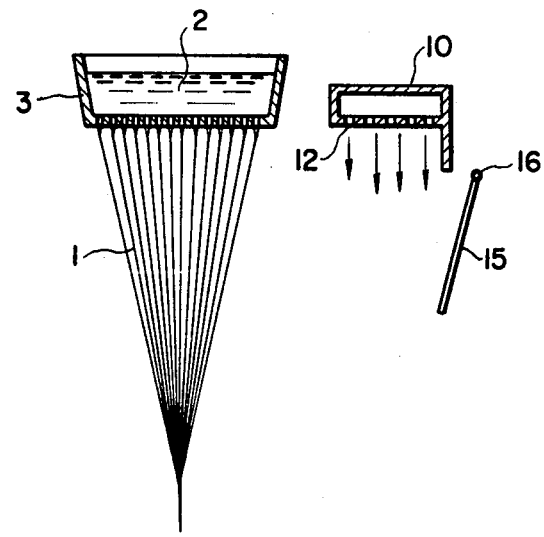
FIGS. 3 and 4 show enlarged side views of a draw forming furnace with the damper plate lowered during stable filament forming and winding and with the damper plate raised during the initial start-up period, respectively.
Figure 4:
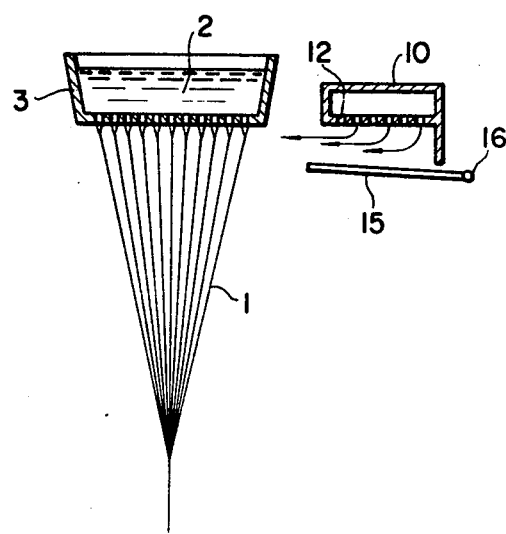

FIG. 3 illustrates the position of the damper plate(s) 15 during steady or normal forming and winding conditions, while FIG. 4 shows the damper plate in a horizontal or raised position during the start-up period.

The time during which the air flow is directed across the orifice plate is normally about 5 to 10 seconds, after which the forming and winding conditions become stabilized. The damper plates may be operated either manually or in a program controlled sequence using a motor drive. The damper material is preferably heat radiation blocking and/or heat resistant, such as tinted glass. In such case the bottom surface of the orifice plate can be observed through the damper plate, which at the same time blocks the heat radiation and protects the operator's eyes. The invention can be applied to melt furnaces having a flat bottomed orifice plate, one with downwardly projecting nozzle tips, etc. The direction, velocity and quantity of the flow of air directed across the orifice plate is determined by suitably controlling the positions and configurations of the duct 10 and/or the damper plate 15.

What is claimed is:

1. In a method for draw forming glass filaments wherein molten glass flows through holes in an orifice plate on the bottom of an elevated melt furnace to form a plurality of individual filaments which are collected and drawn downwardly by winding means, and wherein a heat shielding air curtain is established between an air flow supply duct adjacent the furnace and a floor exhaust duct to protect the operator, the improvements comprising the steps of: deflecting the air flow from said supply duct across the bottom of the orifice plate at least during the initial start-up period of the filament forming operation, to thereby cool the molten glass cones formed at the orifice plate hole exits and increase their viscosity to prevent adjacent cones and filaments from converging together, and forming said heat shielding air curtain from said air flow when forming and winding conditions are stabilized.

2. A method as defined in claim 1, wherein the air flow is deflected in a direction substantially parallel to the orifice plate.

3. A method as defined in claim 1, wherein the air flow is deflected in an upwardly inclined direction with respect to the orifice plate.

4. A method as defined in any of the preceding claims, wherein the air flow is deflected for from 5 to 10 seconds.

5. In an apparatus for draw forming glass filaments wherein molten glass flows through holes in an orifice plate on the bottom of an elevated melt furnace to form a plurality of individual filaments which are collected and drawn downwardly by winding means, and wherein a heat shielding air curtain is established between an air flow supply duct adjacent the furnace and a floor exhaust duct to protect the operator, the improvement comprising:

means for deflecting the air flow from said supply duct across the bottom of the orifice plate at least during the initial start-up period of the filament forming operation, to thereby cool the molten glass cones formed at the orifice plate hole exits and increase their viscosity to prevent adjacent cones and filaments from converging together, said means for deflecting being positioned relative to said supply duct to retract and allow the formation of said air curtain when forming and winding conditions are stabilized.

6. An apparatus as defined in claim 5, wherein the deflecting means comprises a pivotally mounted damper plate disposed adjacent the supply duct outlet.

7. An apparatus as defined in claim 6, wherein the damper plate is formed of a heat radiation blocking material having a limited degree of transparency to visible light, such as tinted glass.

* * * * *